United States Patent Office 3,141,873
Patented July 21, 1964

3,141,873
PREPARATION OF LIGNOSULFONATE RESINS
Worth C. Goss, Kirkland, Wash., assignor, by mesne assignments, to Gossol, Inc., Seattle, Wash., a corporation of Washington
No Drawing. Filed June 22, 1959, Ser. No. 821,673
6 Claims. (Cl. 260—124)

This invention relates to the treatment of waste sulfite liquor. More particularly, this invention relates to the production of thermosetting resins from ammonia base waste sulfite liquor and to the further treatment of such resins to improve their qualities for the purpose of acting as binders for artificial cellulosic board.

This application is a continuation-in-part of my copending applications Serial No. 643,519, filed March 4, 1957, entitled "Lignosulfonate Derivative," now Patent No. 3,079,353, and Serial No. 658,676, filed May 13, 1957, entitled "Composition Board."

In my copending application Serial No. 643,519, I have described a method of treating ammonia base waste sulfite liquor to produce a thermosetting resin which is useful as a binder for cellulosic board made from wood pulp. In the said method, dehydrated waste sulfite liquor is extracted with liquid anhydrous ammonia to extract sugars and other nonlignin materials, leaving behind a residue of lignosulfonate which is soluble in water at a low pH and which is insoluble in liquid ammonia. This insoluble residue is refluxed with acetone and formaldehyde to form a thermosetting resin. The refluxed product is then added to a pulp which is then made into a board, and the board is subjected to suitable heat treatment and tempering to form a high strength, low density board. It is an important advantage of this procedure that the separated, ammonia-insoluble lignosulfonate (from which a thermosetting resin is prepared) is soluble in acid solution. Among the advantages of solubility in aqueous acid solution are the following: When the acid-soluble lignosulfonate is converted to a thermosetting resin, and the resin is deposited on cellulosic fibers and is heated to bring about setting, the setting properties of the resin are superior to those of a similar resin prepared from an acid-insoluble lignosulfonate. Also, when the resin from an acid-soluble lignosulfonate is added to a pulp, the pulp is less viscous than a similar pulp containing a similar resin from an acid-insoluble lignosulfonate. This latter feature (low viscosity) makes possible a greater rate of laydown of fibers and a greater speed of production of a board or paper product, e.g., as much as a 50% greater rate of laydown and board or paper production.

I have now found that this method can be improved considerably by first subjecting the waste sulfite liquor, while it is in liquid form, to heat treatment, and I have also found that the properties of the refluxed product referred to above can be considerably improved for purposes of board manufacture by reacting it with urea and dicyandiamide or other like nitrogenous materials capable of introducing acid acceptor groups into the resin.

The preliminary heat treatment referred to has an insolubilizing effect on the lignosulfonate, but it is not carried out to the point of rendering the lignosulfonate acid insoluble.

In accordance with my present invention, I commence with liquid waste sulfite liquor, either as it comes from the mill, or in partly concentrated form, or as produced by dissolving dehydrated waste sulfite liquor in water. This liquid starting material is then heated sufficiently to condense a considerable proportion of the sugars and other nonlignin material with the lignosulfonate but insufficiently to render the lignosulfonate insoluble in acid aqueous solution. The heat treated liquor is then dehydrated and extracted with liquid ammonia. The undissolved residue is then treated as described in my said copending application Serial No. 643,519, i.e., it is refluxed with acetone and formaldehyde or other suitable substitute materials such as crotonaldehyde or furfural to form a thermosetting resin.

Thereafter, in accordance with the present invention, when the resin is ready for use as a binder to form a cellulosic board from wood pulp, it is further reacted with urea and dicyandiamide to incorporate acid acceptor groups. Other nitrogenous acid acceptor reagents may be used. For example, urea may be used alone or dicyandiamide may be used alone. Alternatively, the following nitrogenous materials or combinations thereof may be used: Amines such as methylamine, ethylamine and aniline; urea derivatives such as the N-alkyl ureas, e.g., propyl urea ($C_3H_7HN \cdot CO \cdot NH_2$); melamine, guanidine, biuret, etc. However, a mixture of urea and dicyandiamide is preferred.

Among the advantages of the heat treatment step of the present invention are the following: The yield of lignosulfonate is considerably increased. Also, the insoluble lignosulfonate residue from the ammonia extraction has a powdery character and is easy to handle and to filter, whereas the lignosulfonate residue produced without the preliminary heat treatment is gummy and difficult to handle and to filter. Also, the end product of the process has superior board making properties. For example, I have found that the yield of insoluble lignosulfonate (i.e., that which will not dissolve in liquid anhydrous ammonia) can be increased from about 50% without heat treatment to about 70% with heat treatment. Also, the insoluble lignosulfonate has a powdery character which makes it easy to handle and filter, whereas the lignosulfonate produced in the absence of a preliminary heat treatment is difficult to handle and filter. Evidently the heat treatment eliminates a large portion of the hygroscopic, gummy sugars and other nonlignin materials by condensing them with each other and with the lignosulfonate, thereby increasing the yield of insoluble lignosulfonate and improving its properties.

In the preliminary heat treatment of the liquor the pH of the liquor drops considerably and an odor of furfural becomes quite noticeable.

The liquor employed is preferably ammonia base waste sulfite liquor, but it may be any other waste sulfite liquor, for example, magnesium or calcium. In the latter case, the liquor may be heat treated directly, but preferably the calcium or magnesium ions are exchanged for ammonium ions, as by ion exchange, or by treating calcium base liquor with ammonia and carbon dioxide to precipitate the calcium as calcium carbonate, or by treating magnesium base liquor with ammonia to precipitate magnesium hydroxide.

The advantage of the final step of treating the resin with a nitrogenous material to introduce acid acceptor groups is as follows: In using the resin to produce a high strength, low density board as described in my copending application Serial No. 658,676, the board is heated at temperatures of about 300° F. At these temperatures the acidic or corrosive nature of the unmodified resin may have a damaging effect on the fibers. The ammonia in the unmodified resin is reactive at lower temperatures to alleviate the damaging action of the acidic portion of the resin, but at high temperatures the urea and dicyandiamide are more effective. Therefore, the incorporation in the resin of basic nitrogenous acid acceptor groups such as urea and dicyandiamide, renders the resin more compatible with cellulosic fibers at temperatures of the order of 300° F.

The following specific examples will further illustrate the practices and advantages of my invention:

Example I

Ammonia base waste sulfite liquor containing 10% to 12% solids is heated at 350–360° F. for about 1.5 hours. The starting pH is about 4. During heating the pH drops to about 1.5 to 2. Heating in this manner at an acid pH does not insolubilize the lignosulfonate, which remains soluble in acid solution. At the end of this period of time a strong odor of furfural is noticeable. During heat treatment sulfur dioxide is evolved and is vented. The liquor is then cooled to about 212° F. and barium hydroxide may be added to precipitate sulfate. It is preferred, however, to leave the sulfate in the liquor because, when the resinous end product is used in board manufacture, the boards have a lower linear expansion due to the presence of sulfate ion. The liquor is then dehydrated to a dry product containing only a small amount of moisture. The dehydrated product is then extracted with liquid anhydrous ammonia, as follows:

One hundred parts by weight of dehydrated liquor are mixed with 500–700 parts by weight of liquid anhydrous ammonia. The dehydrated liquor and liquid ammonia are preferably mixed in an insulated, closed vessel and insoluble powder is filtered from the liquid and washed with fresh anhydrous liquid ammonia. The filtrate and washings are drawn off and then evaporated and recovered. The insoluble powder is then dissolved in water to a concentration of about 10% and is refluxed with formaldehyde and acetone. The acetone is employed in an amount about 10% of the weight of solids and the formaldehyde in the amount of about 15% based on the solids, the amount of formaldehyde being calculated as anhydrous HCHO but being used in the form of the usual commercial 37% aqueous solution. Refluxing is continued for about three hours.

Example II

The product of Example I is a thermosetting resin which is stable at room temperature, that is to say, it has a long pot life and can be stored for long periods of time. Just prior to its use as a binder for cellulosic board it is reacted with urea and dicyandiamide as follows:

Urea is added in the amount of 20% of the solids in the resin solution resulting from Example I and dicyandiamide is added in the amount of about 4% of the solids. The mixture is held at 75° C. for about 30 minutes. The resin produced in this manner has a short pot life, e.g., about 24 hours at room temperature. Therefore it should be used within a short time as a binder for cellulosic board in accordance with the procedure described in my copending applications. For example, it may be added to a pulp, which is then formed into a pad on a board making machine, and the pad is squeezed to remove most of the water, and it is then subjected to drying and heat treatment in accordance with my application Serial No. 658,676.

Among the advantages of the thermosetting, lignosulfonate-derived resin prepared as in Examples I and II are the following: A board prepared with this resin by the procedure of my copending application Serial No. 658,676 is very stable dimensionally. For example, a typical piece of Douglas fir lumber has a linear expansion of 0.1% along the board between a relative humidity of 50% and a relative humidity of 90%; the same lumber has a 6% linear expansion tangential to the three trunk on th esame basis (i.e., at 90% compared to 50% relative humidity), if measured across a board; and synthetic board produced with my improved resin has a linear expansion in any direction except thickness (same basis) of only 0.2%.

Also the resin of my present invention greatly increases the rate of laydown fibers in a board making machine.

This resin will also produce synthetic boards without a compacting pressure, which swell somewhat in thickness on exposure to moisture, but return to their original thickness on drying. Board prepared with other resins require application of pressure to compact the board, and when such boards swell they do not shrink back to their original thickness on drying.

It will, therefore, be apparent that substantial improvements have been made in the production of useful chemicals from waste sulfite liquor.

I claim:

1. A method of treating waste sulfite liquor comprising the steps of heating the liquor in liquid form at a temperature of approximately 350° to 360° Fahrenheit for a period of approximately 1.5 hours, dehydrating the liquor to a relatively dry product and then extracting the dry product with liquid anhydrous ammonia.

2. In a method of treating waste sulfite liquor, the steps comprising heating the liquor in liquid form at a temperature of approximately 350° to 360° Fahrenheit for a period of 1.5 hours, dehydrating the liquor to a relatively dry product, extracting the dry product with anhydrous ammonia, then refluxing the undissolved residue with a mateiral selected from the group consisting of acetone, formaldehyde, crotonaldehyde and furfural to form a thermosetting resin.

3. A method as defined in claim 2, including the further step of reacting the thermosetting resin with an acid acceptor reagent selected from the group consisting of urea, dicyandiamide, methylamine, ethylamine, aniline, N-alkyl urea, propyl urea, melamine, guanidine and biuret.

4. A method as defined in claim 2 including the further step of reacting the thermosetting with a reagent consisting of a mixture of urea and dicyandiamide.

5. A method of treating waste ammonia base sulfite liquor comprising the steps of maintaining the liquor at a temperature of 350° to 360° Fahrenheit for a period of approximately 1.5 hours to condense a substantial proportion of sugars and other nonlignin material with lignosulfonate, dehydrating the liquor to form a dry product, then extracting the dry product with liquid anhydrous ammonia.

6. A method of treating waste ammonia base sulfite liquor comprising the steps of maintaining the liquor at a temperature of 350° to 360° Fahrenheit for a period of approximately 1.5 hours to condense a substantial proportion of sugars and other nonlignin material with lignosulfonate, dehydrating the liquor to form a dry product, mixing 100 parts by weight of the dry product with 500 to 700 parts by weight of liquid anhydrous ammonia to form a powder and liquid mixture, filtering the powder from the liquid, washing the powder with fresh anhydrous liquid ammonia, dissolving the powder in water to form a mixture having a concentration of approximately 10% powder, and then refluxing the mixture with formaldehyde and acetone.

References Cited in the file of this patent

UNITED STATES PATENTS

| | | |
|---|---|---|
| 2,401,373 | Robinson et al. | June 4, 1946 |
| 2,676,931 | Pollak | Apr. 27, 1954 |
| 2,710,255 | Van Blaricom et al. | June 7, 1955 |
| 2,822,358 | Hearon et al. | Feb. 4, 1958 |
| 2,849,314 | Gross | Aug. 24, 1958 |
| 2,944,922 | Boggs et al. | July 12, 1960 |